United States Patent [19]

Herceg

[11] Patent Number: 4,666,798
[45] Date of Patent: May 19, 1987

[54] SERIALLY CONNECTED SOLID OXIDE FUEL CELLS HAVING MONOLITHIC CORES

[75] Inventor: Joseph E. Herceg, Naperville, Ill.

[73] Assignee: The United States of America as represented by the United States Department of Energy, Washington, D.C.

[21] Appl. No.: 736,168

[22] Filed: May 20, 1985

[51] Int. Cl.[4] .................. H01M 8/00; H01M 8/10
[52] U.S. Cl. .................................. 429/12; 429/30; 429/32
[58] Field of Search .................. 429/12, 30, 32, 33

[56] References Cited

U.S. PATENT DOCUMENTS

| | | | |
|---|---|---|---|
| 3,472,697 | 10/1969 | Sandstede et al. | 429/32 |
| 4,038,462 | 7/1977 | Rohr | 429/32 |
| 4,431,715 | 2/1984 | Uenberg | 429/30 |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,499,663 | 2/1985 | Zwick et al. | 429/623.1 |
| 4,510,212 | 4/1985 | Fraioli | 429/30 |
| 4,547,437 | 10/1985 | Isenberg et al. | 429/30 |

FOREIGN PATENT DOCUMENTS 2614728 10/1977 Fed. Rep. of Germany ........ 429/30

OTHER PUBLICATIONS

Dept. of Interior, Project Fuel Cell Research and Development Report No. 57, 1970.
Doenitz et al. "High Temperature Electrolysis of Water Vapor".
Feduska et al. "High Temperature Oxide Fuel Cel-1-Technical Status", *Journal of Power Sources*, 1983, pp. 89-102.
Rohr, "High Temperature Fuel Cells", *Solid Electrolytes* pp. 431-450, 1978.
Isaacs, "Solid Electrolyte Fuel Cells", *Fuel Cells*, Nov. 1981, pp. 83-107.
Isenberg, "Energy Conversion by Solid Oxide Electrolyte Electrochemical Cells at High Temperature" *Solid State Ionics* pp. 431-437, (1981).

*Primary Examiner*—Brian E. Hearn
*Assistant Examiner*—Stephen J. Kalafut
*Attorney, Agent, or Firm*—Hugh W. Glenn; Robert J. Fisher; Judson R. Hightower

[57] ABSTRACT

A solid oxide fuel cell for electrochemically combining fuel and oxidant for generating galvanic output, wherein the cell core has an array of cell segments electrically serially connected in the flow direction, each segment consisting of electrolyte walls and interconnect that are substantially devoid of any composite inert materials for support. Instead, the core is monolithic, where each electrolyte wall consists of thin layers of cathode and anode materials sandwiching a thin layer of electrolyte material therebetween. Means direct the fuel to the anode-exposed core passageways and means direct the oxidant to the cathode-exposed core passageways; and means also direct the galvanic output to an exterior circuit. Each layer of the electrolyte composite materials is of the order of 0.002–0.01 cm thick; and each layer of the cathode and anode materials is of the order of 0.002–0.05 cm thick. Between 2 and 50 cell segments may be connected in series.

20 Claims, 11 Drawing Figures

SERIALLY CONNECTED SOLID OXIDE FUEL CELLS HAVING MONOLITHIC CORES

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

A fuel cell is basically a galvanic energy conversion device that chemically converts hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperatures of the fuel cell are between 700° and 1,100° C.

The hydrogen reaction on the anode (the negative electrode) with oxide ions generates water with the release of electrons; and the oxygen reaction on the cathode with the electrons effectively forms the oxide ions. Electrons flow from the anode through the appropriate external load to the cathode, and the circuit is closed internally by the transport of oxide ions through the electrolyte. The electrolyte, however, electrically insulates the cathode and anode from one another. Thus, the reactions are at the:

cathode $\frac{1}{2}O_2 + 2e^- \rightarrow O^{-2}$  (1)

anode $H_2 + O^{-2} \rightarrow H_2O + 2e^-$.  (2)

The overall cell reaction is $H_2 + \frac{1}{2}O_2 \rightarrow H_2O$.  (3)

In addition to hydrogen, the fuel can be derived from a hydrocarbon such as methane ($CH_4$) reformed by exposure to steam at 350° to 800° C., which initially produces carbon monoxide (CO) and three molecules of hydrogen. As hydrogen is consumed, a shift reaction occurs as follows $CO + H_2O \rightarrow CO_2 + H_2$.  (4)

The overall reaction of hydrocarbons is illustrated by $CH_4 + 2O_2 \rightarrow CO_2 + 2H_2O$.  (5)

Inasmuch as the conversion is electrochemical, the thermal limitations of the Carnot cycle are circumvented; therefore efficiencies in the range of 50% fuel heat energy conversion to electrical output can be theoretically obtained. This is much higher than equivalent thermal engines utilizing the same fuel converson, including even a conventional diesel powered engine.

The electrolyte isolates the fuel and oxidant gases from one another while yet provides a medium allowing the ionic transfer and voltage buildup across the electrolyte. The electrodes (cathode and anode) provide paths for the internal movement of electrical current within the fuel cell to the cell terminals, which also connect then with an external load. The voltage across each cell is of the order of 0.7 volts maximum, so the individual cell must be placed in electrical series to obtain a useful voltage. A series connection is accomplished between adjacent cells with an interconnect material which isolates the fuel and oxidant gases from one another while yet electronically connects the anode of one cell to the cathode of an adjoining cell. As the active electrochemical generation of electrically takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrode also limits the cell performance. Fuel and oxidant must diffuse at right angles from the flow in the respective passageways through the electrodes to the reaction sites. The fuel and oxidant diffuse through the electrodes and react at (or near) the three-phase boundary of the gases, the electrode (anode or cathode), and electrolyte, whereat electrochemical consumption occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2 + CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2 + Y_2O_3$); and the anode would be layered over the electrolyte comprised, for example, of a cobalt yttria-stabilized zirconia cermet or mixture ($Co + ZrO_2Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially along the tube length.

An alternate construction provides an electrical interconnect at a cordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred.

Moreover, the tube supports are nonproductive and heavy so that the power and energy densities suffer when compared to other forms of energy conversion, including even the liquid electrolyte fuel cells more commonly operated at lower temperatures.

SUMMARY OF THE INVENTION

This invention provides an improved construction of serially connected fuel cells each having a honeycomb core comprised of many small individual monolithically formed cells or passageways through which the fuel and the oxidant are passed for the electrochemical conversion of the same.

A basic object of this invention is to provide a construction or array of serially connected fuel cell segments each having a monolithic honeycomb fuel cell core comprised solely and exclusively of the active anode, cathode, electrolyte and interconnect materials, and with no nonactive materials for support.

A more specific object of this invention is to provide a construction or array of serially connected fuel cell segments each fuel cell segment has a monolithic honeycomb fuel core comprised solely and exclusively of either the anode and cathode materials sandwiching the electrolyte or the anode and cathode materials sandwiching the interconnect material, where the cells are thus otherwise devoid of nonactive materials for support.

A further object of this invention is to provide a construction or array of serially connected fuel cell segments each having a monolithic core comprised solely and exclusively of the specific active materials including the anode, cathode, electrolyte and interconnect; where corresponding portions of the core walls are fused into similar composite structures and where these portions are oriented in side by side alternately defined arrays of passageways suited to have the fuel and oxidant passed through the alternately adjacent passageways where longitudinally adjacent fuel cell segments have the anodes and cathodes thereof serially connected.

Another object of the present invention is to provide a a fuel cell for electrochemicaly combining fuel and oxidant for generation of galvanic output, comprising an array of longitudinally arranged fuel cell segments in series connection, each fuel cell segment consisting essentially of thin layers of cathode material and anode material respectively sandwiching a thin layer of electrolyte material constructed to define a plurality of fuel and oxidant passageways wherein the inside faces thereof are only the anode material or only the cathode material, interconnect material establishing electrical series connection between the cathodes and anodes of longitudinally adjacent fuel cell segments, means to direct the fuel and the oxidant through the respective passageways, and means to direct the galvanic output from the anode and cathode materials to an exterior circuit.

A still further object of the present invention is to provide a fuel cell segment for electrochemically combining fuel and oxidant for generation of galvanic output, comprising a honeycomb consisting essentially of thin layers of cathode material and anode material respectively sandwiching a thin layer of electrolyte material constructed to define a plurality of fuel and oxidant passageways wherein the inside faces thereof are only the anode material or only the cathode material, each passageway having the cathode material extending beyond the anode material at one end thereof and having the anode material extending beyond the cathode material at the other end thereof.

The anode, cathode, electrolyte and interconnect materials are selected and modified to comply with the required electrically conductive aspects of the cathode, anode, and interconnect, the ionic transport and electronic isolation aspect of the electrolyte, and the gas porosity requirement of the cathode and anode and the gas imperforate requirement of the electrolyte and interconnect. Likewise, the structural integrity, thermal expansion and contraction ratios, and crystal integrity of the composite monolithic core are designed for the specific operational parameters of temperature, pressure, gas flow rates, voltage and current densities necessary to provide optimal efficiency.

In a preferred embodiment of the invention, the interconnects and the electrolyte layers are thin (0.002–0.01 cm) while the sandwiching cathode and anode layers are perhaps between the same thickness or even five times this (0.002–0.05 cm).

The monolithic cores and the serial connections thereof provide greatly increased power density, perhaps fifty times those of a conventional support tube-type fuel cell, due to the increased active exposure areas of fuel and oxidant compared to the corresponding flow path volumes, and due further to reduced current path lengths having overall lower internal electrical resistance losses. The monolithic core of each serially connected fuel cell segments eliminates all support structures other than the active materials themselves; and the anode, cathode, electrolyte and interconnect layers are quite thin, to reduce the fuel cell weight. As the defined fuel and oxidant passageways of the core are small, the material layers can be thin and yet self-supporting over the small distances across the defined passageways. Conventional tube-type support structures can be eliminated. Moreover, thin layers of the active materials are possible because of the shorter current paths required. The monolithic core design minimizes diffusion losses by eliminating the thick support tube entirely and by employing thin active electrodes, and the serial connection of the fuel cell segments exclusively with the previously mentioned cell components contributes to the overall cell efficiency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

RELATED U.S. PATENTS

The application Ser. No. 541,184, entitled "Method of Fabricating a Monolithic Core for a Solid Oxide Fuel Cell" having Stanley A. Zwick and John P. Ackerman as joint inventors, filed Oct. 12, 1983, discloses the repetitive and sequential application of deposits of each of the anode, cathode, electrolyte and interconnect materials onto itself for building up the interconnect and electrolyte core walls endwise of the walls or in line with the flow passageways defined by the walls. Each electrolyte and interconnect wall of the core consists respectively, of anode and cathode materials layered on the opposite sides of electrolyte material, or on the opposite sides of interconnect material. Each separate deposit of each separate material is made over the entire core cross section simultaneously, whereby complicated shapes or cross sections of the flow passageways for the fuel and oxidant can be made as simply as can regular or symmetrical overall cross sections be made.

The application entitled "Integral Manifolding Structure for Fuel Cell Core Having Parallel Gas Flow", having Joseph E. Herceg as sole inventor, now U.S. Pat. No. 4,476,197, issued Oct. 9, 1984, discloses means for directing the fuel and oxidant gases to parallel flow passageways in the core. A core wall projects beyond the open ends of the defined core passageways and is disposed approximately midway between and parallel to the adjacent overlying and underlying interconnect walls to define manifold chambers therebetween on opposite sides of the wall. Each electrolyte wall defining the flow passageways is shaped to blend into and be connected to this wall in order to redirect the corresponding fuel and oxidant passageways to the respective manifold chambers either above or below this intermediate wall. Inlet and outlet connections are made to these separate manifold chambers respectively, for carrying the fuel and oxidant gases to the core, and for carrying their reaction products away from the core.

The application entitled "Solid Oxide Fuel Cell Having Monolithic Cross Flow Core and Manifolding", having Roger B. Poeppel and Joseph T. Dusek as joint inventors, now U.S. Pat. No. 4,476,196, issued Oct. 9, 1984, discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

The application Ser. No. 541,176, filed Oct. 12, 1983 entitled "Solid Oxide Fuel Cell Having Compound Cross Flow Gas Patterns", having Anthony W. Fraioli as sole inventor, discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageway disposed normal to one another. This provides for the solid mechanical connection of the interconnect walls of adjacent tiers to the opposite sides of the common electrolyte wall therebetween only at spaced point-like contact areas, where the previously mentioned line-like contact areas cross one another. The inert support material comprises between 2 and 98 wt. % of the whole core, varied as needed to minimize differential thermal expansion of the composite core wall structures.

The application entitled "Solid Oxide Fuel Cell Having Monolithic Core", having John P. Ackerman and John E. Young as joint inventors, now U.S. Pat. No. 4,476,198 issued Oct. 9, 1984 discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. The thin composite core walls can be shaped to define small passageways, while yet having sufficient structural integrity to withstand the fluid pressure generated by gas flow through the passageways and the mechanical stresses due to the weight of the stacked core walls on one another. This beneficially increases the power density of the fuel cell because of its reduced size and weight.

DETAILED DESCRIPTION OF THE INVENTION

Figure 1:
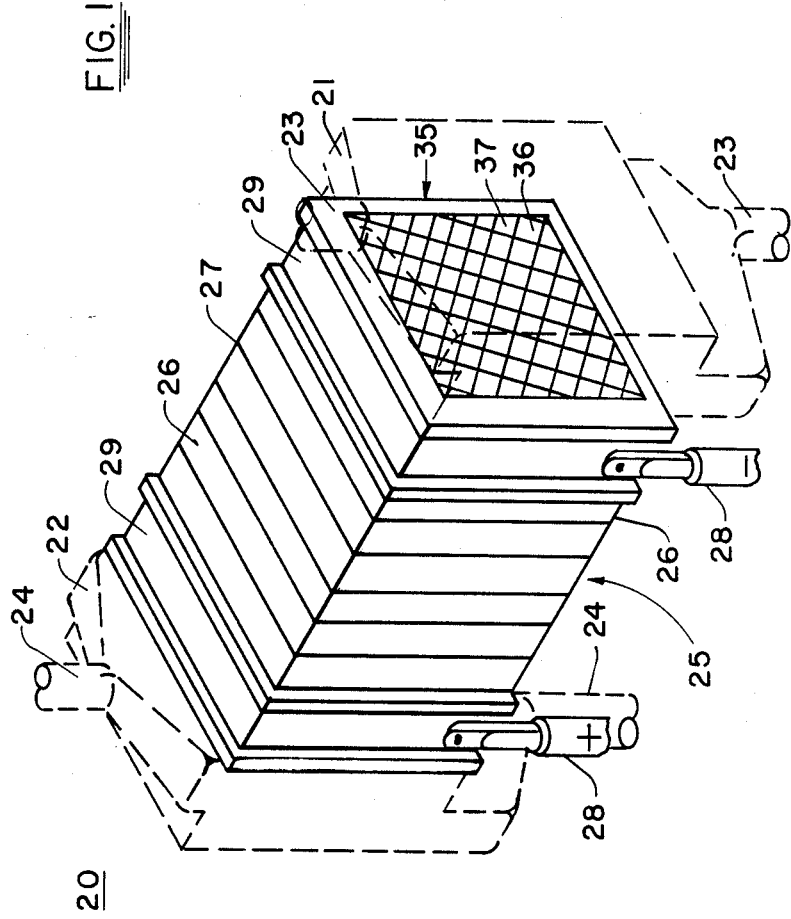
FIG. 1 is a schematic perspective view of a fuel cell having an array of fuel cell segments showing a portion of the end manifolds illustrating the basic conception of the invention.
Figure 2:
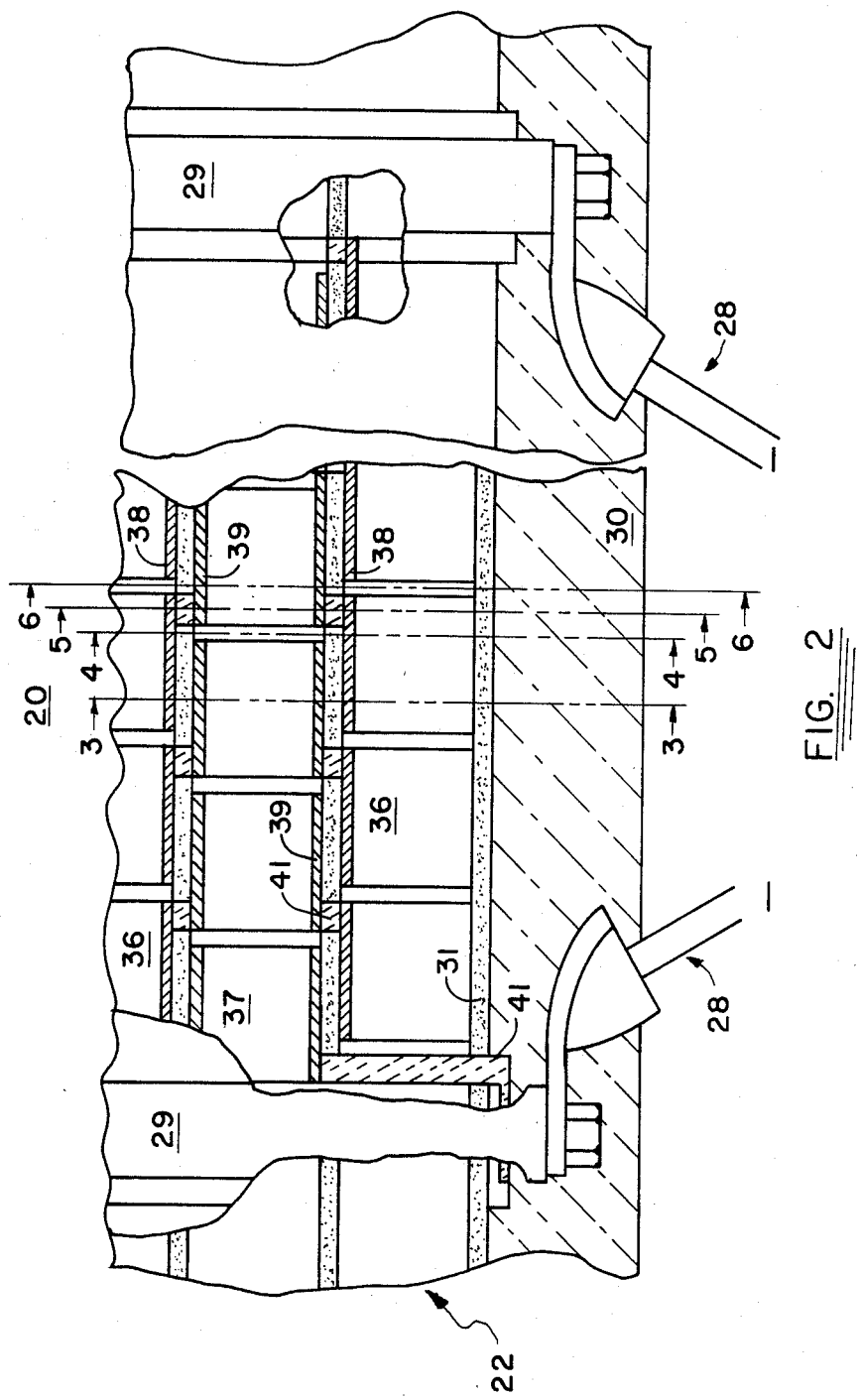
FIG. 2 is an enlarged sectional view of a portion of the array of fuel cell segments illustrated in FIG. 1.

FIG. 1 illustrates a fuel cell 20 comprised of an array 25 of fuel cell segments 26, the end most segment being connected respectively to an inlet manifold 21 and an outlet manifold 22. The inlet and the outlet manifolds 21, 22 are provided with inlet ports 23 and outlet ports 24 for either reactant feed or exhaust, as will be explained. Each of the fuel cell segments 26 is connected in series connection with the adjacent fuel cell segments by means of an area 27 of interconnect material 41. Power take-off conductors 28 are in electrical connection with buss straps 29 contacting interconnect material 41 that extends through wall 31 of array 25 at its endmost segments. Finally, as is illustrated in FIG. 2 the entire array 25 is surrounded by thermal insulation 30.

Referring to FIGS. 2-6 the array 25 is comprised of a series of fuel cell segments 26 each of which is square in transverse cross section connected one to the other to form a honeycomb 35 defining adjacent fuel passageways 36 and oxidant passageways 37. Each of the fuel segments 26 is solely and exclusively comprised of planar walls of either the anode material 38 or planar walls of cathode material 39 which sandwich therebetween either electrolyte material 40 or interconnect material 41. As is well known, the actual galvanic output is created by the presence of anode material 38 and cathode material 39 sandwiching an electrolyte material 40, wherein the fuel is passed in contact with the anode materials 38 and oxidant is passeed in contact with the cathode material 39, thereby to provide the galvanic output of the fuel cell 20.

Figure 3:
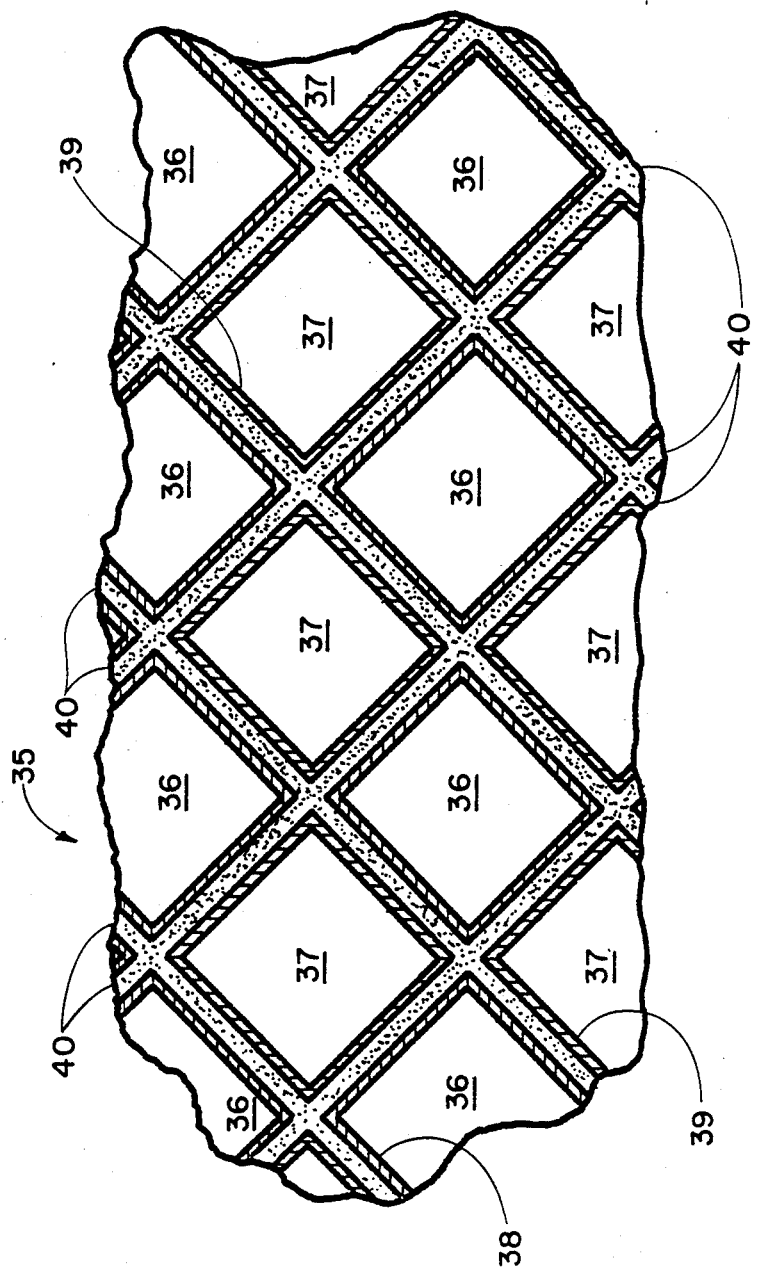
FIG. 3 is a partial view in section of the array illustrated in FIG. 2 taken along lines 3—3 thereof.

As seen particularly in FIG. 3, the honeycomb 35 is comprised of a plurality of adjacent square in cross section fuel passageways 36 and oxidant passageways 37 defined respectively by four interconnecting planar anode walls 38 and four interconnecting planar cathode walls 39. By use of the terms wall or anode walls, it is meant that the material forming the wall is exclusively cathode material or anode material. The honeycomb configuration 35, therefore, is made exclusively of materials active in the production of galvanic output with the exception, as will hereinafter be explained, of interconnect material 41 which serves to provide the series connection between adjacent fuel cell segments 26. In the inventive construction, there is no support material or other inactive material which decreases the efficiency of the fuel cell. Although a variety of geometries may be used such as triangles or circles, the preferred embodiment is a fuel segment 26 which is square in transverse cross section as illustrated in FIG. 3. As will be understood by those skilled in the art, which fuel cell segment 26 in a particular row in the honeycomb 35 is connected in parallel and will have substantially the same voltage since voltage, is determined by the flow rate and content of the fuel and oxidant passing along the anode walls 38 and cathode walls 39. In the preferred honeycomb construction 35 there are no dead wall space except at the corners of each fuel cell segment 26, thereby providing the most efficient geometry possible.

As illustrated in FIGS. 2 through 6, each fuel cell segment 26 is square in transverse cross section and is constructed of four anode walls 38 and four cathode walls 39 on opposite sides of a thin electrolyte 40. Each fuel cell segment 26 has at one end thereof a portion of the anode wall extending beyond the adjacent electrolyte 40 which extends beyond the adjacent cathode material 39 and at the other end thereof the fuel cell segment 26 has cathode material 39 extending beyond the adjacent electrolyte material 40 which in turn extends beyond the adjacent anode material 38. The three layers of anode material 38 and cathode material 39 and intermediate electrolyte material 40 are staggered which is important in providing the series connection while preventing adjacent segments 26 from short circuiting. As seen particularly in FIG. 5, the interconnect material 41 is in the form of square rings surrounding each segment 26 and forms an electrical connection between the outwardly extending anode material 38 of one cell and the outwardly extending cathode material 39 of the adjacent cell to serially connect adjacent fuel cell segments 26.

Figure 4:
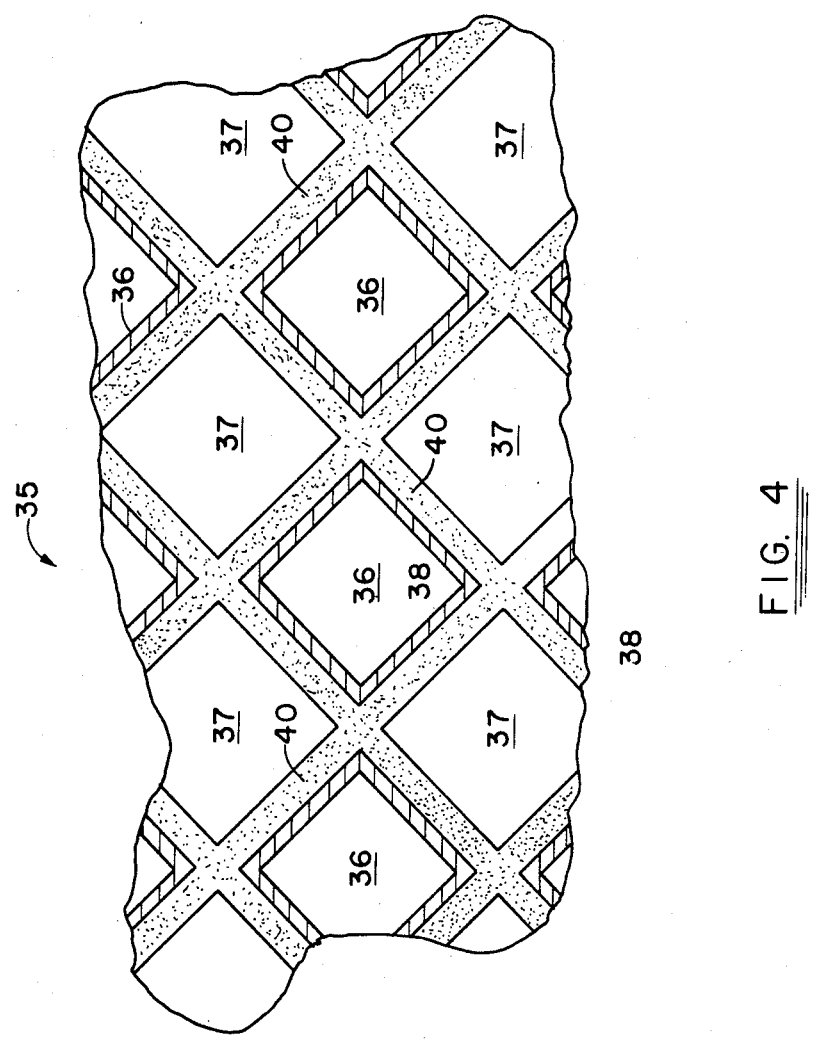
FIG. 4 is a partial view in section of the array illustrated in FIG. 2 taken along lines 4—4 thereof.
Figure 5:
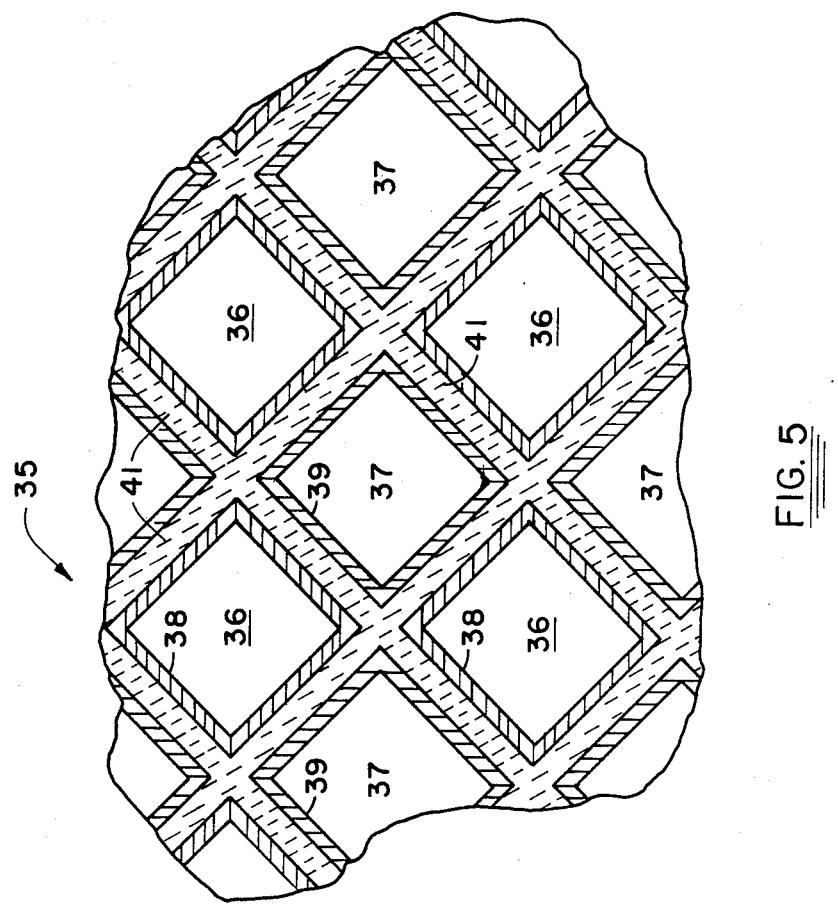
FIG. 5 is a partial view in section of the array illustrated in FIG. 2 taken along lines 5—5 thereof.
Figure 6:
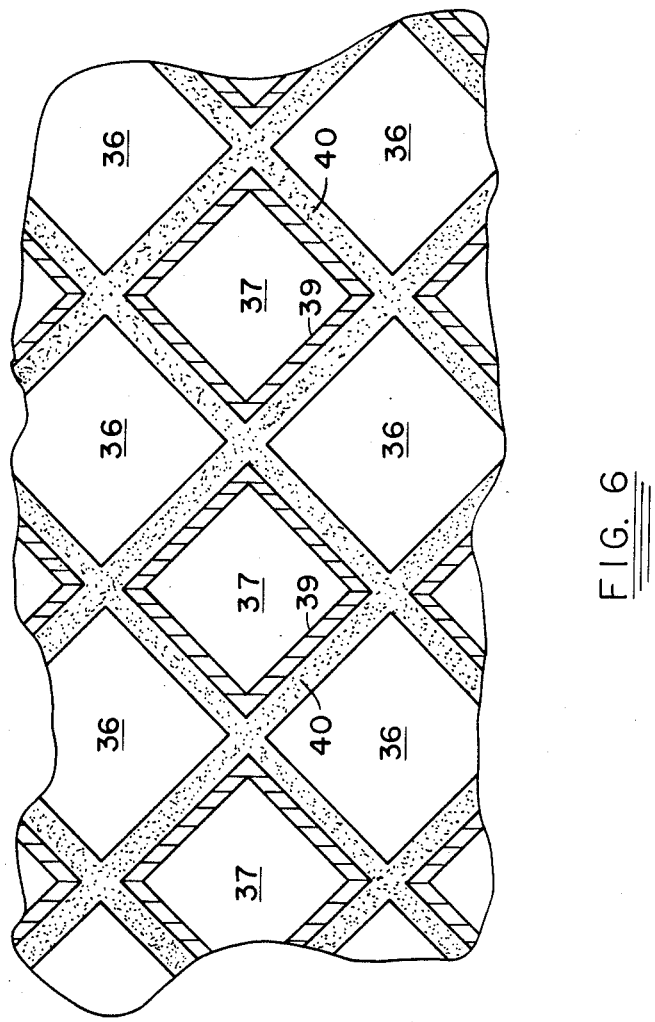
FIG. 6 is a partial view in section of the array illustrated in FIG. 2 taken along lines 6—6 thereof.

In addition, it will be noted that the anode material 38 of adjacent fuel cell segments 26 are separated as are the cathode material 39 of adjacent fuel cell segments 26 to prevent electrical shorting of adjacent fuel cell segments. FIGS. 4 and 6 respectively show the spaces between the cathode material 39 and the anode material 38 for adjacent fuel cell segments 26. The interconnect 41 provides the electrical series connection between the adjacent longitudinally extending segments 26, thereby forming the array 25 of fuel cell segments which are constructed in the honeycomb configuration 35 illustrated in the drawings.

Figure 7:
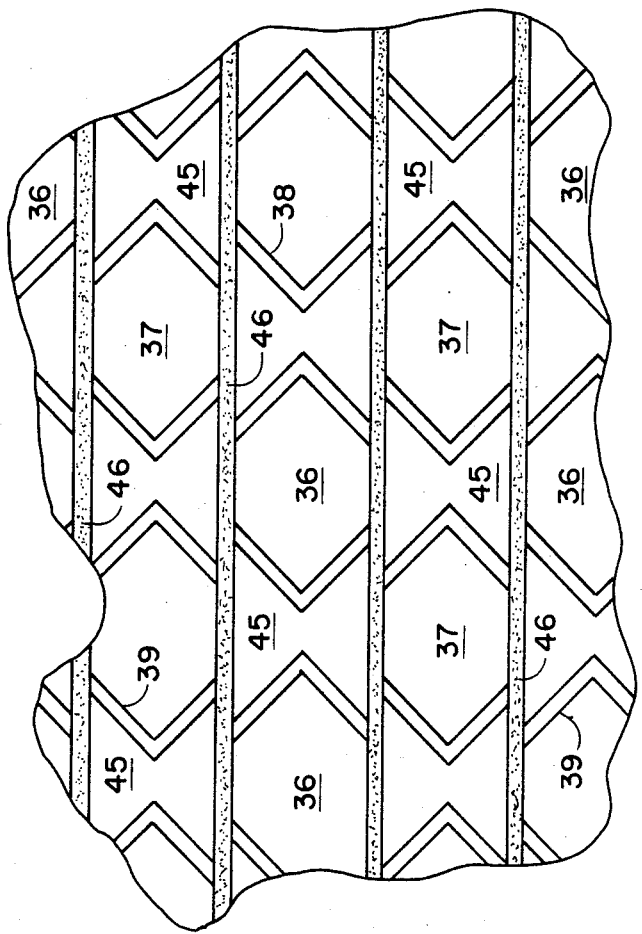
FIG. 7 is a partial end view of the fuel cell illustrated in FIG. 1 showing portions of the manifold construction.

The manifolds 21 and 22 each include manifold blocking material 45 as illustrated in FIG. 7 which in cooperation with strips of manifold material 46 provide interconnecting flow paths for the oxidant to the cathode segments 39 and fuel to the anode segments 38, via the oxidant channels 37 and the fuel channels 36, respectively. It will be noted that the manifold blocking material 45 is located at the corners of each fuel cell segment 26 to provide a connection between diagonally related anodes 38 and diagonally related cathodes 39 while preventing mixing of the fuel and the oxidant. The manifold material 45, 46 may be the same as the electrolyte material 40, as hereinafter set forth.

Figure 8:
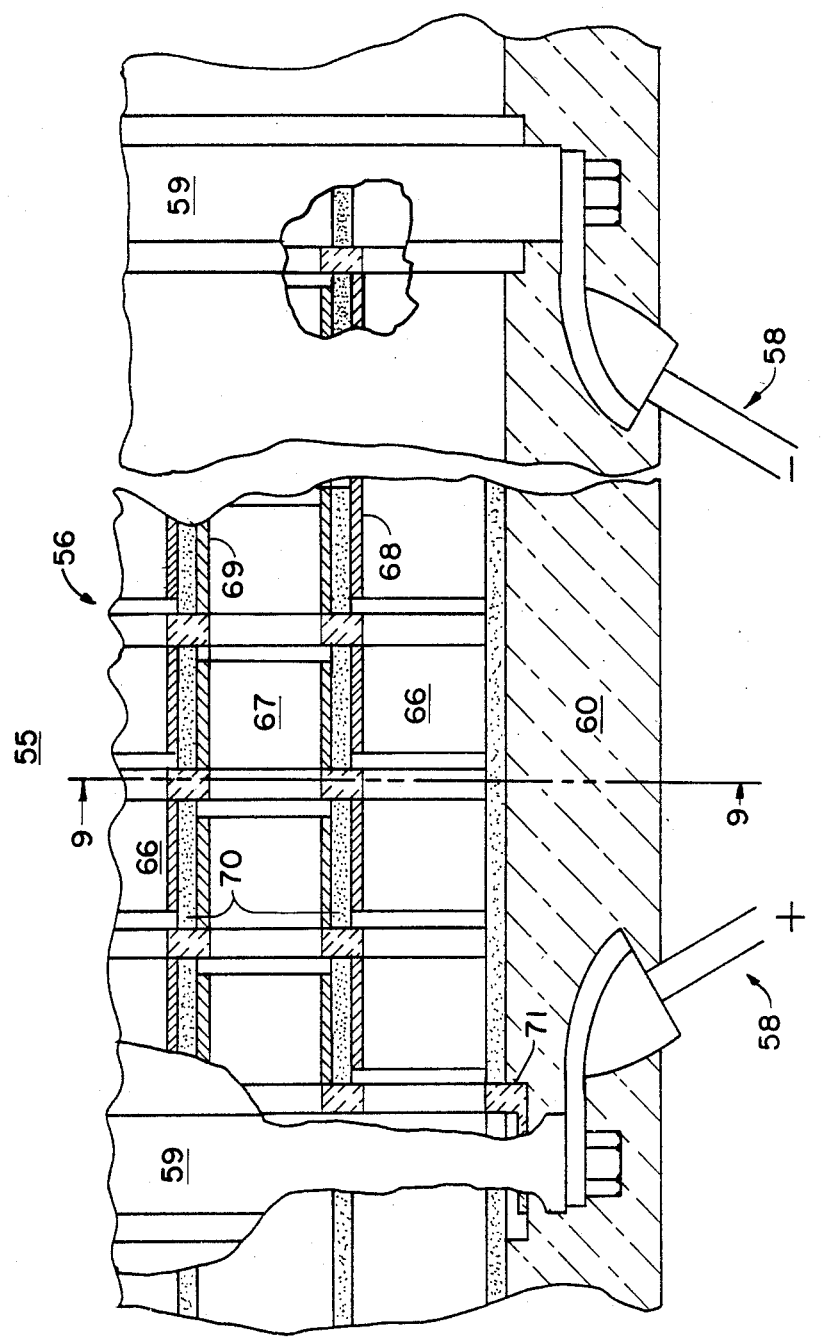
FIG. 8 is a view like FIG. 2 of another embodiment of the invention.
Figure 9:
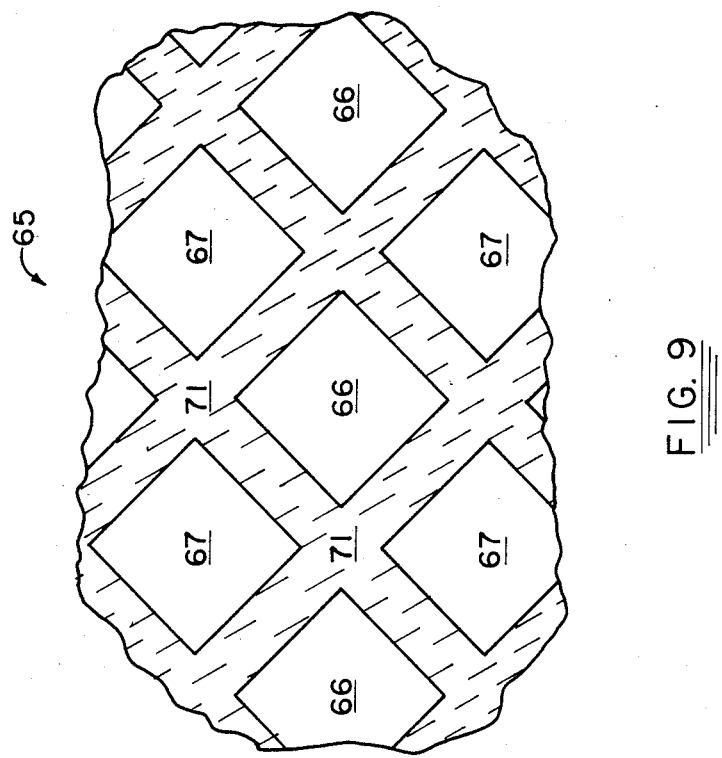
FIG. 9 is a sectional view of the fuel cell illustrated in FIG. 8 taken along lines 9—9 thereof.

Referring to FIGS. 8 and 9 there is an alternate embodiment of the invention wherein an array 55 of individual fuel cell segments 56 has power take-off conductors 58 connected by buss straps 59 contacting interconnect material 71 that extends through wall 61 of the array at the end most segments 56. Thermal insulation 60 is provided as aforesaid. The segments 56 are arranged in honeycomb configuration 65 exactly the same as the honeycomb 35 defining adjacent fuel passageways 66 and oxidant passageways 67 respectively by means of anode walls 68 and cathode walls 69. The anode material 68 is separated from the cathode material 69 by the electrolyte material 70, as previously described and the electrical series connection between adjacent cathodes and anodes is accomplished by means of interconnect material 71.

The difference between the fuel segments 26 and 56 is in the construction of the interconnect material 71 which is not overlapped by adjacent anode material 68 and cathode material 69 but lies between the end surfaces of the anode material 68 and cathode material 69 of adjacent segments 56. In the embodiment illustrated in FIGS. 8 and 9, the interconnect material 71 is thicker than the interconnect material 41 and abuts only the end surfaces of the anode material 68 and the cathode material 69 whereas in FIG. 2 the interconnect material 41 lies between the overlapping portions of adjacent anode material 38 and cathode material 39. Also in the fuel cell segments 56, the end surfaces of the electrolyte 70 is coterminous with the end surfaces at one end of the anode material 68 and at the other end with the cathode material 69, there being provided the required electrical insulation between the cathode materials of adjacent segments 56 and between the anode materials of adjacent fuel cell segments 56. In all other respects, the fuel cell segments 56 and the fuel cell segments 26 are the same.

Referring to FIGS. 2 and 3, each wall of the honeycomb 35 is comprised of anode material 38, cathode material 39 and intermediate electrolyte 40, thereby providing passageways 36 for the fuel and passageways 37 for the oxidant on opposite sides of each cell formed by the three layer configuration. Gaseous fuel would be conveyed from a source, not shown, to one of the manifolds 21, 22 for flow through the passageways, 36 toward the outlet manifold on the other end of the array 25. Likewise, oxidant would be carried from a source to the other manifold, if the flow is countercurrent or to the other end of the same manifold as the fuel if the flow is to be concurrent. The fuel and oxidant admitted to the honeycomb 35 at the purities and flow rates required, would react electrochemically across the walls formed by the three layered materials aforementioned, that is the walls formed by a combination of the anode material 38, the cathode material 39 and the electrolyte 40 interposed therebetween. Fuel and oxidant not consumed in the honeycomb 35 with reactants combined by combustion within the outlet manifold 21, 22 subsequently will be discharged with the other reaction products from the fuel cell 20.

It may be desirable to provide a slight reduction in cross sectional area of the discharge end of the fuel passageways 36 so that unconsumed fuel from the fuel passageways would be jetted into the outlet manifolds 21, 22 where its reaction with the oxidant therein would occur in effect as jets of flame. This restricted fuel outlet area would also minimize the possibility of oxidant back flowing into the fuel passage ways 36 from the outlet manifolds 21, 22 which would then induce direct fuel-oxidant reaction internally of the anode passageway. Generally, the pressure differential between the fuel and the reaction products in the manifold 21, 22 is quite low, and the velocity of the gases within or through the passageways 36, 37 is likewise quite low.

It should be appreciated that where anode material 38 and cathode material 39 are on opposite sides of the electrolyte 40, there is defined a fuel cell which electrochemically combines the fuel and the oxidant being conveyed respectively in the passageways 36 and 37 to develop an electrical potential across the electrolyte 40.

As will be appreciated, the anode material 38 and the cathode material 39 are porous to the degree required to allow the fuel and oxidant gases confined on the opposite sides thereof to electrochemically combined, while the electrolyte 40 and the interconnect material 41 are impervious and serve to isolate the fuel oxidant gases completely from one another. Likewise, the electrolyte material 40 is electrically non-conductive as between the anode material 38 and the cathode material 39 formed on opposite sides thereof but the electrolyte material 40 does provide ionic conductivity; and moreover both the anode material 38 and the cathode material 39 are electrically conductive. On the other hand, the interconnect material 41 electrically connects adjacent fuel cell segments 26 by connecting the anode material 38 of one segment with the cathode material 39 of the adjacent segment.

In a practical fuel cell 20 of the type shown herein, many serially connected fuel cell segments 26 will be provided with perhaps as many as fifty longitudinally extending serially connected segments. The outermost segments 26 of the array 25 are connected electrically via power take-off conductors 28 electrically connected to the end most segments 26 by means of buss bars 29 or other electrically suitable connections. The conductors 28 may be connected to the end most segments 26 by interconnect material 41 or other suitable material which may be either integral with the fuel cell 20 or may be wrapped around in electrical connection. As is well known in the solid oxide fuel cell art, it is preferable to have the conductors 28 in a fuel environment rather than an oxidizing environment so that it mahy be desirable to bleed a small amount of fuel over the conductors 28 to minimize the oxidation thereof. In the disclosed honeycomb 35, the fuel cell segments 26 have rather short wall spans to provide the passageways 36 and 37 with relatively small cross sectional areas in the order of several square millimeters. Because of the small wall spans, the thin layered materials each totalling only fractions of a millimeter in thickness will yet be structurally sufficient to support the weight of the segments 26 and any gas and/or reaction pressure loads required.

The embodiment of the fuel cell 20 illustrated herein provides a fuel and oxidant passageway containment that has a very effective ratio of the area of the electrolyte wall material 40 to the interconnect material 41 so as to produce both a high current density as well as a high voltage due to the series connection of the segments 26. In the illustrated embodiment, adjacent fuel passageways 36 and oxidant passageways 37 are parallel one to the other while the walls forming the passageways are planar and form a plurality of squares in transverse cross section. The length of each fuel cell segment 26 may be in the range of from about 0.1 centimeter to about 5 centimeters while the width of each segment or the wall length of each segment forming each square will be in the same order, that is in the range of between about 0.1 centimeter to about 5 centimeters. The width of the entire honeycomb 35 as well as the height may be anywhere in the range of from about 5 centimeters to about 70 centimeters and the number of longitudinally connected segments 26 may range from about 2 to about 50 segments. The method of fabricating the honeycomb structure 35 as well as the manifolds 21, 22 are disclosed in the references cited above, the disclosures of which are incorporated herein by reference.

Typically, the electrolyte 40 might have a thickness in the range of between 0.002 and 0.01 centimeters and preferably in the range of between 0.002 and 0.005 centimeters thick; while the anode and the cathode may have a thickness in the range of between about 0.002 and 0.05 centimeters and preferably have a thickness in the range of from about 0.005 to about 0.02 centimeters. Accordingly, the composite wall of anode material 38, cathode material 39 and the electrolyte material would be in the range of from about 0.006 and 0.11 centimeters in thickness and preferably in the range of about 0.012 to about 0.045 centimeters in thickness. The interconnect material 41 will have a corresponding thickness to the electrolyte material 40 and accordingly the combination of anode material 38, cathode material 39 and interconnect material 41 will have the same thickness as previously discussed with respect to a combination of anode, cathode and electrolyte material.

A typical cathode will be lathanum manganite ($LaMnO_3$); the electrolyte would be comprised of yttria-stabilized zirconia ($ZrO_2 + Y_2O_3$); and the anode would be a cobalt yttria-stabilized zirconia cermet or mixture ($Co + ZrO_2Y_2O_3$). The interconnect material 41 might be comprised for example of lanthanum chromite ($LaCrO_3$) where the lanthanum manganite ($LaMnO_3$) and the lanthanum chromite ($LaCrO_3$) are suitably doped to obtain electrical conductivity, all as well known in the art.

Figure 10:
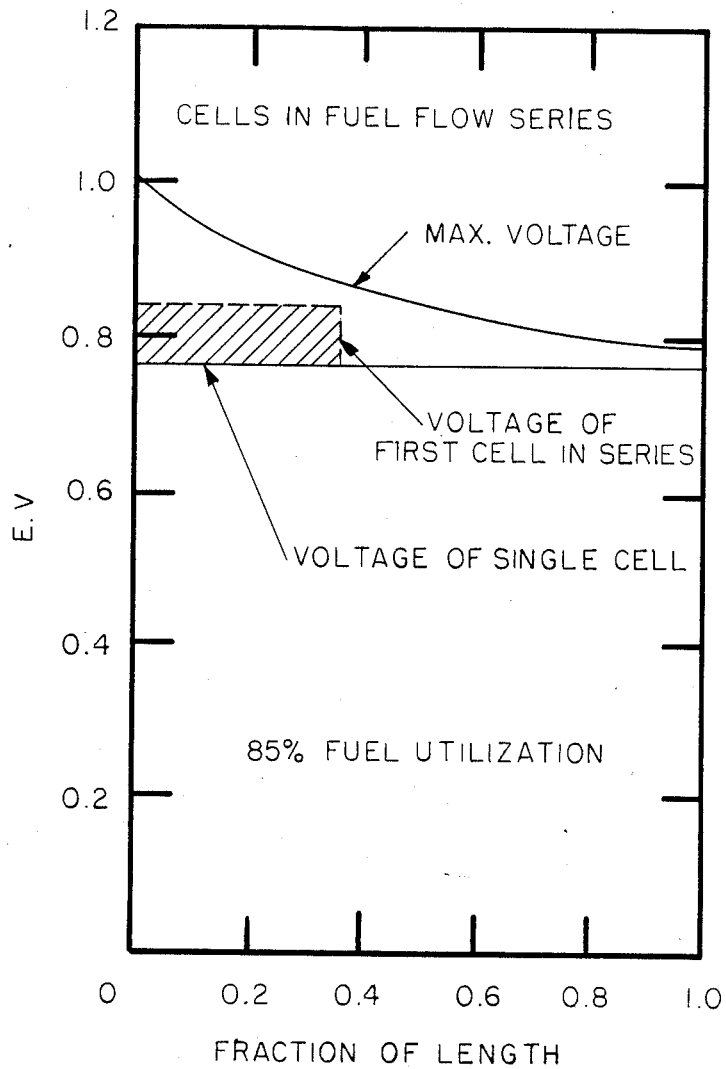
FIG. 10 is a graph illustrating the relationship between the length of the array and the electrical power for an array of fuel cell segments of the invention.

The advantage of serially connected power cells is illustrated in FIG. 10 which shows the relationship between the power of the cell and the length of the segments connected in series. An approximate 6 percent increase in electrical power is available when individual segments are connected in electrical series along the reactant flows path as opposed to configurations of equal potential connections. This gain results from the electrical potential gradient occurring from reactant depletion along the monolithic core length.

One principal advantage of the present invention as regards the prior art serially connected cell disclosed by the Westinghouse Electric Corporation in an annual report covering the period June 1, 1980 to May 30, 1981 entitled "High Temperature, Solid Oxide Electrolyte Fuel Cell Power Generating System" is the short current paths in the electrodes of the present design which minimizes the resistance losses in the electrode that are the principal losses in a cell of this type.

Figure 11:
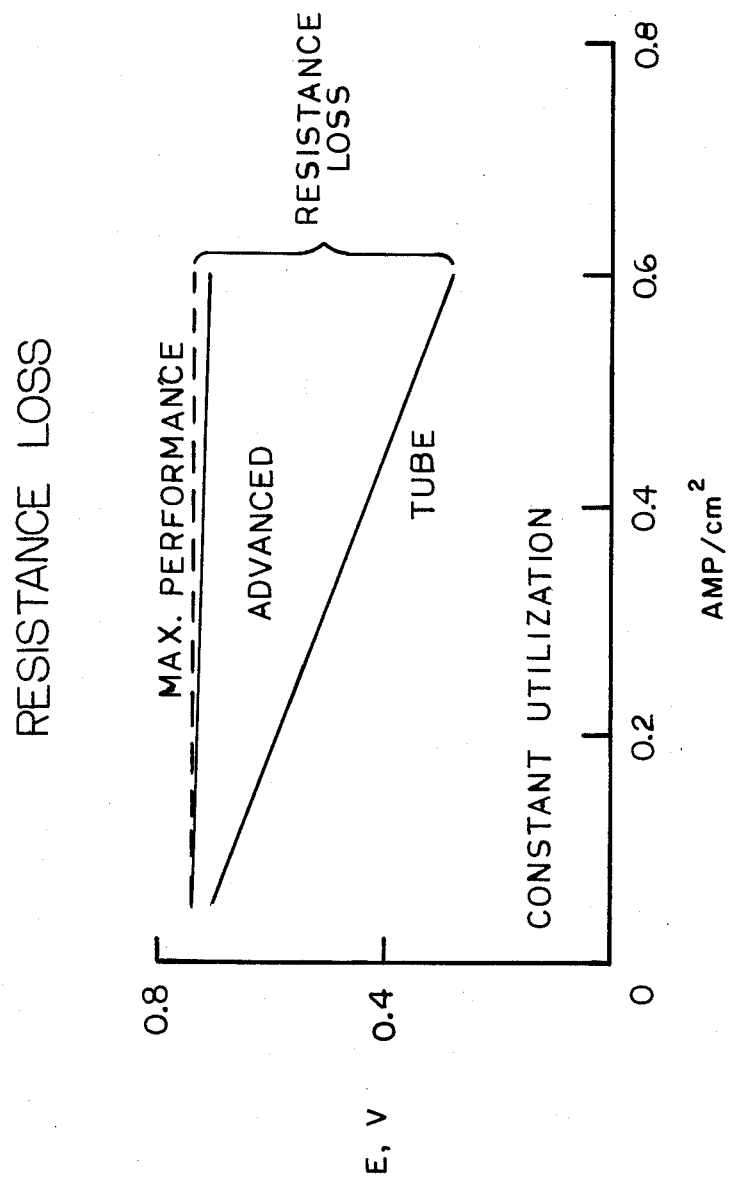
FIG. 11 is a graph illustrating the relationship between the resistance loss and the length of current path in the monolithic core of the subject invention composed with the Westinghouse prior art series Fuel Core.

FIG. 11 shows the relationship between the electrical potential and the reduced resistance loss due to the shorter path lengths of the monolithic core of the invention as compared to the Westinghouse design of tubular or flashlight battery-type solid oxide fuel cell designs. As can be seen from FIG. 11, the resistance loss in the subject cell is considerably less than that experienced in the Westinghouse tubular design.

In another aspect of the invention the power take-off conductors 28 may be connected directly to the end most segments 26 in the array 25 by means of interconnect material 41, thereby eliminating the requirements for buss bars 29 which greatly reduces current paths and electrical resistance in the cell 20. The entire structure of the cell 20 including the design of the honeycomb 35 as well as the use of interconnect material 41 to provide the series connection between adjacent segments 26 provides a much more compact cell 20 than heretofore possible allowing substantially greater voltages to be generated.

While there has been described what at present is considered to be the preferred embodiment of the present invention, it will be appreciated that various alterations may be made therein without departing from the true scope and spirit of the invention which is intended to be covered in the claims appended hereto.

The embodiments of the invention in which an exclusive property or privilege is claimed are defined as follows:

1. A fuel cell for electrochemically combining gaseous fuel and oxidant for generation of galvanic output, comprising an array of longitudinally arranged fuel cell segments in series connection, each fuel cell segment consisting essentially of thin layers of cathode material and anode material respectively sandwiching a thin layer of electrolyte material constructed to define a plurality of parallel fuel and oxidant passageways of substantially uniform transverse cross section wherein the inside faces thereof are only the anode material or only the cathode material establishing serial flow connections between the respective anodes of adjacent fuel cell segments and the respective cathodes of adjacent fuel cell segments, interconnect material different than either electrode material establishing electrical series connection between the respective cathodes and anodes of longitudinally adjacent fuel cell segments, means to direct the fuel and the oxidant gases through the respective parallel passageways to provide serial parallel flow in substantially one direction therealong, and means to direct the galvanic output from the anode and cathode materials to an exterior circuit.

2. A fuel cell according to claim 1, wherein said cathode material is lanthanum manganite ($LaMnO_3$); said anode material is cobalt yttria-stabilized zirconia cermet or mixture ($Co + ZrO_2Y_2O_3$); said electrolyte material material is yttria-stabilized zirconia ($ZrO_2 + Y_2O_3$); and said interconnect material is lanthanum chromite ($LaCrO_3$), the lanthanum manganite and lanthanum chromite being suitably doped to obtain electrical conductivity.

3. A fuel cell according to claim 1, wherein the interconnect material is disposed between the anode material and cathode material of adjacent fuel cell segments.

4. A fuel cell according to claim 1, wherein said walls defining said passageways are generally planar and form a plurality of squares in transverse cross section.

5. A fuel cell according to claim 4, wherein said cathode is lanthanum manganite ($LaMnO_3$); said anode is cobalt yttria-stabilized zirconia cermet or mixture ($Co + ZrO_2Y_2O_3$); said electrolyte is yttria-stabilized zirconia ($ZrO_2 + Y_2O_3$); and said interconnect is lanthanum chromite ($LaCrO_3$), the lanthanum manganite and lanthanum chromite being suitably doped to obtain electrical conductivity.

6. A fuel cell according to claim 5, wherein said means to direct the galvanic output from the anode and cathode materials to an external circuit includes electrically conductive material around the outermost segment at each end of said array.

7. A fuel cell according to claim 1, wherein each layer of the electrolyte and interconnect materials is of the order of 0.002–0.01 cm thick and each layer of the cathode and anode materials is of the order of 0.002–0.05 cm thick.

8. A fuel cell according to claim 7, wherein each wall forming the fuel or oxidant passageway is on the order of 0.006–0.11 cm thick.

9. A fuel cell according to claim 1, wherein each segment has a longitudinal extent in the range of from about 0.1 cm to about 5 cm.

10. A fuel cell according to claim 9, wherein there are between 2 and about 50 segments in the array.

11. A fuel cell according to claim 10, wherein the number of segments present in the array is in the range of from 2 to about 10.

12. A fuel cell according to claim 1, wherein each segment is square in transverse cross section to the direction of fuel and oxidant flow having a side length in the range of from about 5 cm to about 70 cm.

13. A fuel cell according to claim 1 and further comprising thermal insulation surrounding said array.

14. A fuel cell segment for electrochemically combining gaseous fuel and oxidant for generation of galvanic output, comprising a honeycomb consisting essentially of thin layers of cathode material and anode material respectively sandwiching a thin layer of electrolyte material constructed to define a plurality of parallel fuel and oxidant passageways of substantially uniform transverse cross-section wherein the inside faces thereof are only the anode material or only the cathode material establishing serial flow connections between the respective anodes of adjacent fuel cell segments and the respective cathodes of adjacent fuel cell segments, each passageway having the cathode material extending beyond the anode material at one end thereof and having the anode material extending beyond the cathode material at the other end thereof separated by interconnect material which is different than either electrode material to accommodate gas flow in said passageways in substantially one direction only.

15. The fuel cell segment according to claim 14, wherein said cathode material is lanthanum manganite ($LaMnO_3$); said anode material is cobalt yttria-stabilized zirconia cermet or mixture ($Co+ZrO_2Y_2O_3$); said electrolyte material is yttria-stabilized zirconia ($ZrO_2+Y_2O_3$); and said interconnect material is lanthanum chromite ($LaCrO_3$), the lanthanum manganite and lanthanum chromite being suitably doped to obtain electrical conductivity.

16. The fuel cell segment according to claim 14, wherein the thickness of the thin layer of electrolyte is in the range of from about 0.002 cm to about 0.01 cm.

17. The fuel cell segment according to claim 14, wherein the thickness of the thin layer of anode material or cathode material is in the range of from about 0.002 cm to about 0.05 cm.

18. The fuel cell segment according to claim 14, wherein the length thereof is in the range of from about 0.1 to about 5 cm.

19. The fuel cell segment according to claim 14, wherein the length that the anode or cathode materials extend beyond each other is in the range of from about 0.002 to about 0.01 cm.

20. The fuel cell segment according to claim 19, wherein interconnect material is in electrical communication with the outwardly extending anode or cathode material.

* * * * *